United States Patent [19]

Mallik

[11] Patent Number: 4,921,319
[45] Date of Patent: May 1, 1990

[54] SURFACE RELIEF HOLOGRAM STRUCTURE WITH REFLECTION FROM AN AIR INTERFACE

[75] Inventor: Donald W. Mallik, North Tarrytown, N.Y.

[73] Assignee: American Bank Note Holographics, Inc., Elmsford, N.Y.

[21] Appl. No.: 301,157

[22] Filed: Jan. 23, 1989

[51] Int. Cl.$^5$ ............................................. G03H 1/02
[52] U.S. Cl. ...................................... 350/3.6; 283/86; 283/91
[58] Field of Search ...................... 350/3.6; 283/86, 91

[56] References Cited

U.S. PATENT DOCUMENTS

| | | |
|---|---|---|
| 3,689,346 | 9/1972 | Rowland . |
| 3,922,065 | 11/1975 | Schultz . |
| 3,924,929 | 12/1975 | Holmen et al. . |
| 4,119,361 | 10/1978 | Greenaway ........................... 350/3.6 |
| 4,582,389 | 4/1986 | Wood et al. . |
| 4,610,499 | 9/1986 | Chern et al. . |
| 4,726,706 | 2/1988 | Attar . |

*Primary Examiner*—Rodney B. Bovernick
*Assistant Examiner*—J. Patrick Ryan
*Attorney, Agent, or Firm*—Majestic, Parsons, Siebert & Hsue

[57] ABSTRACT

A replica hologram structure wherein an information carrying relief pattern on one surface of the hologram is not metallized for reflection, as is the usual case, but rather air between the hologram and a supporting substrate causes incident light to be reflected from the surface relief pattern, thereby to form a reconstruction of an image or other light pattern. The surface relief pattern may be positioned immediately against the substrate, or, alternatively, held apart from it by spacers. The hologram and substrate are held together by any of a wide variety of mechanisms, including adhesive, welding and static electricity, in a manner that does not interfere with the reconstruction or viewing of the image or other light pattern from the hologram. Such a hologram structure has a use in product packaging and other applications where it is desired to be able to look through the hologram as well as be able to view the image or other light pattern reconstructed from it by reflection.

26 Claims, 1 Drawing Sheet

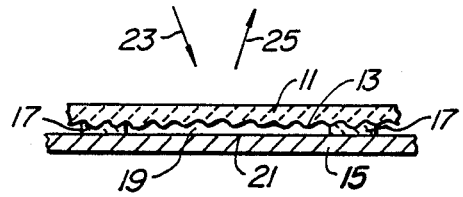
FIG._1.
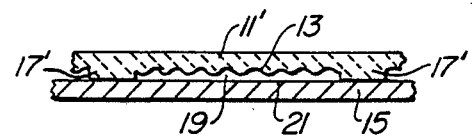
FIG._2.
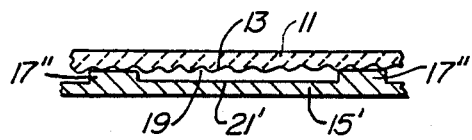
FIG._3.
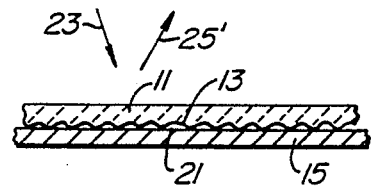
FIG._4.
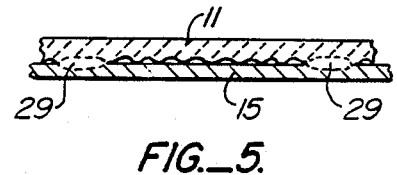
FIG._5.
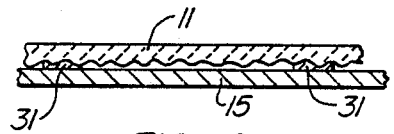
FIG._6.
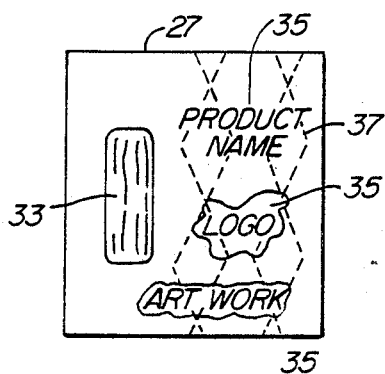
FIG._7.
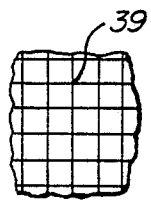
FIG._8.
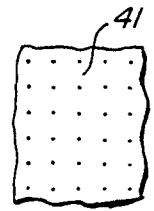
FIG._9.
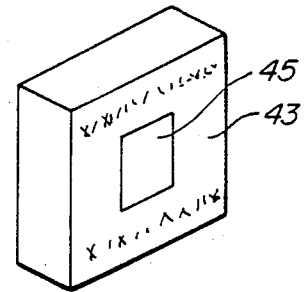
FIG._10.

SURFACE RELIEF HOLOGRAM STRUCTURE WITH REFLECTION FROM AN AIR INTERFACE

BACKGROUND OF THE INVENTION

This invention related generally to the optical arts of holography and diffraction gratings, and, more particularly, to special forms of holograms and diffraction gratings.

Current techniques for making a master hologram or diffraction grating from which replicas can be mass-produced are well known. Briefly, and very generally, two coherent light beams are directed together at a finite angle between them at a photosensitive material surface. An interference pattern between the beams is recorded by the photosensitive material. A photoresist film is commonly used as the photosensitive material, resulting in recording the pattern of interference between the beams as a surface relief pattern.

A desired light pattern can be reconstructed from such a surface relief pattern by diffraction of a portion of illuminating light. If an object is positioned in one of the two interfering beams during exposure of the photosensitive medium, illumination of the surface relief pattern will reconstruct an image of that object in light diffracted by the surface relief pattern when illuminated. For the purposes of this description, the term "hologram" will be used to refer to any such surface relief pattern, or replicas thereof, that is formed as the result of the interference between two coherent light beams, regardless of whether light diffracted from it reconstructs an image of a recognizable object or some other desired light distribution.

Once such a master surface relief hologram is formed, the surface relief pattern is converted to a physically more rugged structure from which replicas can be made. A first step in a usual commercial process is to form a thin layer of nickel by an electrolysis process that conforms to the surface relief pattern. The nickel layer is then mounted on a sturdy support. From this metal master hologram, a number of sub-masters are usually made. Each sub-master replicate of the master surface relief pattern is used to make a large number of copy holograms.

There are two basic techniques being utilized to make hologram replicas. One is an embossing technique wherein the sub-master is urged against thin plastic film under sufficient heat and pressure to transfer the surface relief pattern into a surface of the film. The second technique is a casting process wherein a liquid resin is trapped between the surface relief pattern of a sub-master and a plastic film while the resin is hardened by actinic radiation or other curing technique. When the sub-master and film are separated, a cast surface relief pattern remains attached to the plastic film.

A next step, in both the casting and the embossing replication processes, is to coat the surface relief pattern with a thin layer of opaque, reflective material, usually aluminum. A variation in the sequence of steps for the embossing process is to coat the film with such a reflective layer prior to embossing the surface relief pattern into it. The result for any of these processes is a hologram in which the recorded light pattern is reconstructed in light diffracted in reflection from the coated surface relief pattern. The reflective hologram replica is then attached by lamination or otherwise to a substrate, such as a rigid plastic piece in the case of a credit card using such a hologram for authentication, cardboard in the case of a hologram used in product packaging, or paper in the case of a hologram used as part of a printed document.

Recently, applications have emerged wherein it is desirable that the hologram be only partially reflective so that the hologram may be mounted on a substrate over a photograph, printing and the like that is desired to be authenticated. An example is in the case of passports where such a partially reflective hologram covers at least the passport holder's photograph so that it cannot be removed or altered without destroying the authenticating hologram. The photograph or other material to be authenticated is viewable through the hologram.

One technique for doing this is to maintain a continuous metallized layer on the hologram replica but control its thickness so that it reflects only a portion of illuminating light incident upon it. U.S. patent application Ser. No. 835,524, filed March 3, 1986, of G. O. Searle, now abandoned, describes such a technique. Alternatively, a discontinuous pattern of opaque reflective material is deposited on the surface relief pattern. A hologram image is formed by reflection from the portions of the hologram carrying the reflecting material while a photograph or other material to be protected on a substrate is viewable through the hologram. The discontinuous reflective layer is described in application Ser. Nos. 156,305, filed February 12, 1988, and 160,641, filed February 26, 1988, of Donald W. Mallik. Such partially reflective holograms have also been used in product packaging and other applications where authentication of material on the substrate is not a principal purpose for using the hologram.

It is a primary object of the present invention to provide a hologram replica, combination of a hologram and a substrate, and techniques for making and using them, which are simpler, less costly and which open up a wide range of hologram applications which have not before been practical or possible.

SUMMARY OF THE INVENTION

This and additional objects are accomplished by the various aspects of the present invention wherein, briefly and generally, a non-metallized, transparent surface relief hologram replica is carried by a substrate with its surface relief pattern facing the substrate. Air between the two layers provides an interface with the surface relief pattern, with a resulting change in index of refraction that causes reflection of a portion of incident light into a reconstruction of its recorded image or non-image light pattern. Printing, art work, photographs and the like on the substrate beneath the hologram can also be viewed through the hologram. In one embodiment, spacers are provided to hold the surface relief pattern away from the substrate in order to provide an air backing to the hologram, but it has been found, in another embodiment, that adequate reconstructions result from the surface relief pattern being positioned in contact with the substrate. It is believed that enough of the surface relief pattern remains exposed to an air interface that image reconstruction by light reflected from that interface provides an adequate reconstruction of the object or other light pattern recorded in the hologram.

Additional objects, features and advantages of the various aspects of the present invention are given in the following description of its preferred embodiments, which description should be taken in conjunction with the accompanying drawings.

BRIEF DESCRIPTION OF THE DRAWINGS

FIG. 1 shows a cross-sectional view of one form of a hologram and substrate structure that utilizes spacers therebetween;

FIG. 2 shows a cross-sectional view of a second form of a hologram and substrate structure that utilizes spacers therebetween;

FIG. 3 shows a cross-sectional view of a third form of a hologram and substrate structure that utilizes spacers therebetween;

FIG. 4 shows a cross-sectional view of one form of a hologram and substrate wherein no separate spacers are utilized;

FIG. 5 shows a cross-sectional view of a second form of a hologram and substrate wherein no separate spacers are utilized;

FIG. 6 shows a cross-sectional view of a third form of a hologram and substrate wherein no separate spacers are utilized;

FIG. 7 is a front view of a product packaging example use of one of the structures according to FIGS. 1-6;

FIGS. 8 and 9 illustrate techniques for attaching a hologram to a substrate in the examples of FIGS. 1-6; and, FIG. 10 illustrates another product packaging example of the use of a modified form of one of the structures according to FIGS. 1-6.

DESCRIPTION OF THE PREFERRED EMBODIMENTS

The specific examples of FIGS. 1-3 all include the use of a spacer between the hologram and its substrate in order to assure that a volume of air exists behind the surface relief pattern. Referring to FIG. 1, a thin, flexible plastic film 11 carries a surface relief pattern 13 from which an image or other light pattern may be reconstructed. A substrate sheet 15, typically more substantial than the film 11, carries the film 11 with a large number of spacers 17 therebetween. The spacers 17 form a cavity 19 between the surface relief pattern 13 and a surface 21 of the substrate sheet 15 that faces the surface relief pattern 13. As a result, incident light 23 is partially reflected, as indicated by 25, at the interface between the surface relief pattern 13 and air within the cavity 19. The partial reflection arises because of the different refractive indices of the material forming the surface relief pattern 13, usually a plastic in the neighborhood of n=1.5, and that of air (n=1.0). The image or other light pattern recorded in the surface relief pattern 13 is thus reconstructed in the reflected light 25.

The substrate sheet 15 of FIG. 1 is shown to be opaque. Its surface 21 may be of a uniform color, the darker colors making the image or other light pattern in the reflected light 25 to be more visible. Alternatively, the surface 21 may have printing on it, in which case the object or other light image in the reflected light 25 is viewed with the printed pattern in the background. The entire hologram film 11 is substantially transparent. The surface 21 is viewable therethrough since the usual opaque metal surface is omitted from the surface relief pattern 13. The reflection is caused by the interface of the surface 13 with air in the cavity 19, rather than requiring any reflective material to be placed on the surface relief structure 13.

The hologram 11 can be made by either of the predominant hologram replicating techniques that are in commercial use. The first is an embossing technique, wherein a thin film 11 the relief pattern 13 is formed in a surface thereof by pressing a sub-master plate against the film 11 with sufficient heat and pressure.

Alternatively, the film 11 can have the surface relief pattern 13 cast onto one of its surfaces by holding a polymerizable resin between a sub-master plate and the film while the resin is cured into a hardened state. It is not important, for the purposes of the improvement being described, which of the two replicating techniques are utilized.

After forming the hologram 11, the spacer 17 may conveniently be printed on the surface relief pattern 13 before the hologram 11 is attached to the substrate 15. The spacer 17 may be in the form of a grid pattern or pattern of dots. The surface relief pattern 13 will lose its ability to reconstruct its image or other light pattern from it in the regions contacted by the spacer 17. Therefore, it is desired to minimize the overall area covered by the spacer 17. In most applications, spacers may cover an area within a range of from 5 to 20 percent of the active surface relief pattern 13. The thickness of the hologram 11 is commonly within a range of from 12 to 50 microns. The making of the hologram 11 with increased thickness may tend to allow the spacers 17 to be placed further apart from one without the surface relief pattern 13 touching the opposing substrate surface 21. (Obviously, the drawings of FIGS. 1-6 are not to scale. The period of a variation of the surface relief pattern 13 is in the order of fractions of a wavelength of light, while a cross-sectional dimension of each spacer 17 may be around 200 microns in diameter and separated by each other by more than 600 microns.)

It is preferable that the spacers 17 be optically clear so as to avoid imposing an undesirable light pattern onto what the observer sees from the surface 21 of the substrate and that reconstructed from the surface relief pattern 13. The spacers are preferably formed, in the example of FIG. 1, by taking a completed embossed or cast hologram sheet 11 and printing the spacer 17 thereon with a liquid resin that is allowed to harden by drying or exposure to actinic radiation. If it is desired for a particular application to affix the hologram 11 to the substrate 15 at frequent intervals thereacross, then the spacer 17 are preferably cast from an adhesive material. But this is not necessary, as explained hereinafter.

It might appear to be simpler to coat the surface relief pattern 13 with an optically clear material having a refractive index that is significantly enough greater than that of the film 11 that sufficient reflection will occur at the surface relief pattern 13 interface with it. Such materials are available, but they are extremely expensive and difficult to apply. Therefore, the air interface technique being described is preferred for large volume, low cost applications.

Referring to FIG. 2, a structure modified from that described with respect to FIG. 1 is illustrated. A hologram 11' of FIG. 2 is the same of the replica 11 described with respect to FIG. 1, except that the surface relief pattern 13 must be formed by a casting technique in which the spacers 17' are also cast. This is preferably accomplished in the processing by mechanically altering a metal master surface relief hologram by forming the grooves or holes therein to serve as molds for the spacer 17'. If the spacers are to be a pattern of dots across the surface of the hologram 11', then a corresponding pattern of holes may be punched or drilled into the metal master before it is used to cast the hologram as part of the film 11'.

Another alternative technique for forming spacers is illustrated in FIG. 3. Spacers 17' are formed as part of the substrate 15' while is nothing is added to the surface relief pattern 13 of the hologram replica 11. The spacers 17' can be formed by embossing, printing ink or other material on the surface 21' of the substrate 15', and by similar techniques. The spacers 17" are most conveniently formed by the same printing process that prints information or a design on the surface 21' of the substrate sheet 15', in those cases where such printing exists.

The film and substrate in the embodiments of FIGS. 2 and 3 are preferably attached to each other by use of a low viscosity, free-flowing adhesive applied to the substrate before the film is urged against it.

It may appear that if the metallization is omitted from the surface relief pattern 13, and no layer is coated over the surface relief pattern 13 with a sufficiently different index of refraction to form a reflective surface, that the only other alternative is to make sure that an air space 19 is maintained. It may seem that any contact of the surface relief pattern 13 with the substrate surface 21 would destroy the reflectivity of the surface relief pattern 13 since a required difference in index of refraction is eliminated. This follows from the holographer's experience of inadvertently allowing finger oils or some other liquid to attach itself to an un-metallized surface relief pattern. In such a case, the light diffraction ability of the surface relief pattern is eliminated in those areas where the liquid adheres to it.

However, it has been discovered as part of the present invention that the surface relief pattern 13 of the hologram 11 may be held directly against the surface 21 of the substrate 15, as illustrated in FIG. 4. No spacers are utilized. It has been found that, when illuminated with light 23, the surface relief pattern 13 diffracts sufficient light 25' in order to make an image or other recorded light pattern clearly made visible. It is believed that the structure of FIG. 4 remains workable since only the outward extremities (peaks) of the surface relief pattern 13 touch the surface 21 of the substrate sheet 15. An air interface still exists along the sides and valleys of the outward protruding surface relief portions. Although this is very little air, having a maximum thickness in a range of one-half to two microns for a typical surface relief hologram replica, it has been found to be sufficient air to reflect enough light into the beam 25'.

It has also been found that the hologram 11 need not, for many applications, be attached to the substrate with any regular pattern. Indeed, natural static electricity has been found to be a sufficient attachment mechanism to hold the film 11 flat and smooth on the surface 21 of the substrate 15. Some little attachment is usually desired, however, in order to prevent the hologram film 11 from being ripped off or displaced with respect to the substrate 15 by some strong force it may encounter. An example is shown in FIG. 7, wherein such a hologram is attached to a printed cardboard substrate around at least a portion of its perimeter 27.

It is not necessary for most display holography applications to seal a quantity of air between the hologram and the substrate. The only time that would be required is where conditions of use would likely allow human error to condense liquid in the spaced between the hologram and the substrate, or where they might even get submersed in some liquid. In those cases, sealing of the air from the outside would be necessary, but such applications are rare.

If conditions of the film 11 and the substrate surface 21 do not allow sufficient attachment by natural static electricity, or if there are other requirements of additional attachment, a convenient way of doing so is to periodically weld the hologram 11 to the substrate 15, as indicated in FIG. 5. Weld points 29 are formed by direct application of heat, by indirect heating through application of ultrasonic radiation, radio frequency energy, microwave energy, and the like, in order to partially melt adjoining surfaces of the hologram 11 and the substrate sheet 15. When the melted portions cool, therefore, a strong bond results. Of course, such weld points must be kept to a minimum since the holographic image of the surface relief pattern is obliterated where they occur.

Such a welding technique may also be used to attach the hologram and substrate together in the embodiments of FIGS. 1–3 where spacers are positioned between them, but this is generally not desirable since both the areas of the spacers and the weld points will eliminate significant amounts of effective area of a surface relief pattern. Of course, if the areas of welding can be superimposed with the areas of the spacers, this disadvantage will be reduced, but such registration is difficult to obtain.

Another means of attaching the hologram replica 11 directly to the substrate 15 is by use of areas of adhesive 31 which are confined to small areas of the hologram. Of course, the surface relief pattern will be rendered ineffective where contacted by the adhesive 31. In order to maintain close contact between the hologram 11 and the substrate 15, the adhesive 31 should have a very low viscosity when applied, flowing freely. This is to be distinguished from spacer 17 of FIG. 1, where they also serve to adhere the hologram 11 and substrate 15 together, where the spacer/adhesive material needs to have a very high viscosity when applied so that it builds up a sufficient thickness to satisfy its spacing purpose.

Referring again to FIG. 7, an example of product packaging is given wherein one of the hologram examples of FIGS. 1–6 is utilized. A stiff cardboard substrate carries a product to be sold in a clear plastic bubble or shrink wrap 33. The underlying substrate includes printing and artwork 35 that is clearly visible through the substantially transparent hologram which overlies it. Similarly visible in reflected light is an image or other light pattern 37 that is reconstructed from the surface relief pattern on the inside surface of the covering hologram film, as previously discussed with respect to the examples of FIGS. 1–6.

If for some reason, attachment of the hologram to the underlying cardboard substrate along a portion of its perimeter 27 is not sufficient, an adhesive or a welding process may be applied between the hologram and substrate in a grid-like pattern 39, as shown in FIG. 8. The period of such a typical regular pattern can be anywhere from 4 to 20 lines per inch. Alternatively, a regular pattern of adhesive dots 41, as shown in FIG. 9, can also be applied. The period of such dot spacing can be within a range of 16 to 100 per inch. Such an adhesive pattern can be used to hold the hologram surface relief pattern immediately adjacent the substrate surface, in a manner illustrated in FIG. 6, or may be made thicker in order to space the hologram away from the substrate, in a manner illustrated in FIG. 1. Alternatively, the spacers formed in the manner described with respect to the examples of any of FIGS. 1–3 may be arranged in one of the patterns of FIGS. 8 or 9, whether they also serve to adhere the hologram and substrate together, or not. In any event, the pattern chosen for any spacers that are utilized, or for any adhesive that is utilized, need not have any correspondence to the image or other light pattern recorded on the hologram or the printing or artwork on the underlying substrate.

In the examples given, the substrate has been considered to be opaque, with or without printing on its surface facing the hologram. However, the substrate could also be transparent, even including printing over portions of it, for use in other applications. One such application is illustrated in FIG. 10. A box 43 containing product is of the usual type, being opaque and having printing and artwork on its surface. An opening is provided in the box over which a substantially transparent structure 45 is placed in accordance with any of the combinations described with respect to FIGS. 1–9, except the substrate in this case is a substantially optically clear plastic sheet. The packaging arrangement of FIG. 10 thus allows the product within the package to be viewed, while, at the same time, providing an image or other light pattern reconstructed in light reflected from the window. Printing of alpha-numeric information and/or designs may also be provided on the transparent substrate sheet used in the window 45.

Although the various aspects of the present invention have been described with respect to their preferred embodiments, it will be understood that the invention is entitled to the full protection of the appended claims.

It Is Claimed:

1. A combination of a hologram film and a supporting substrate sheet, comprising:
    said hologram film characterized by:
    being substantially optically transparent to light in a visible portion of the spectrum in at least a substantial continuous area thereacross,
    having a surface relief pattern on a side of said hologram film facing said substrate, said surface relief pattern corresponding to a pattern of light interference fringes formed by an intersection of two coherent light beams,
    an absence of a light reflecting opaque layer over at least a portion of said area across said surface relief pattern, thereby providing a substantially transparent hologram thereacross, and
    means holding said hologram film and said substrate sheet substantially adjacent to each other for maintaining an air interface between them over a substantial common area including said hologram area, thereby to form an interface at the surface relief pattern of the hologram that reflects light in a visible portion of the spectrum directed through the hologram back away from said substrate.

2. The combination according to claim 1 wherein said hologram holding means positions said surface relief pattern immediately against said substrate in a manner that high portions of said surface relief pattern touch said substrate, thereby leaving said air interface between said substrate and portions of said hologram other than said high portions.

3. The combination according to claim 2 wherein said hologram holding means consists of an attachment of said hologram film to said substrate around at least a portion of a perimeter of said substrate.

4. The combination according to claim 2 wherein said hologram holding means includes areas of direct attachment of said surface relief pattern to said substrate that are spaced apart across said common area between said hologram film and said substrate.

5. The combination according to claim 4 wherein said areas of direct attachment include adhesive in said areas.

6. The combination according to claim 4 wherein said areas of direct attachment include the surface relief pattern being melted together with said substrate in order to weld the two together in said areas.

7. The combination according to claim 1 wherein said hologram holding means includes a plurality of spacers spread apart across said common area between said hologram film and said substrate, thereby to separate said hologram surface relief pattern from said substrate.

8. The combination according to claim 7 wherein said spacers are formed in a grid pattern.

9. The combination according to claim 7 wherein said spacers are formed in a periodic pattern of spots.

10. The combination according to claim 7 wherein said spacers are formed as an integral part of said substrate.

11. The combination according to claim 7 wherein said spacers are formed as an extension of the hologram surface relief pattern as an integral portion thereof.

12. The combination according to any of claims 7–10, inclusive, wherein said spacers are formed of adhesive that also holds the hologram film to said substrate.

13. The combination according to any of claims 7–11, inclusive, wherein said hologram holding means additionally includes areas of adhesive between the hologram film and the substrate that are spaced apart across said common area therebetween.

14. The combination according to any of claims 7–11, inclusive, wherein said hologram holding means additionally includes the surface relief pattern being melted together with said substrate in order to weld the two together in said areas that are spaced apart across said common area therebetween.

15. The combination according to any of claims 1–9, inclusive, and 12 wherein a surface of said substrate facing said hologram film is substantially smooth.

16. The combination according to any of claims 1, 2 or 7 wherein said substrate sheet is substantially transparent to light in a visible portion of the spectrum.

17. The combination according to any of claims 1, 2 or 7 wherein said substrate sheet is substantially opaque to light in a visible portion of the spectrum.

18. The combination according to any of claims 1, 2 or 7 wherein said substrate sheet is substantially opaque to light in a visible portion of the spectrum and contains substantially no visible pattern on its surface facing said hologram film.

19. The combination according to any of claims 1, 2 or 7 wherein said substrate sheet is substantially opaque to light in a visible portion of the spectrum and contains a visual pattern on its surface facing said hologram film that is visible through said hologram film.

20. An article, comprising:
    a substantially opaque substrate surface having a visual pattern over at least a portion thereof,
    a thin flexible hologram film that is substantially transparent to light in a visible portion of the spectrum and held over said at least a portion of substrate surface, said film including a surface relief pattern on a side facing said substrate surface from which an image or other light pattern may be reconstructed in light reflected from it but which is characterized by an absence of an opaque light reflecting layer thereon in at least a substantial continuous area thereacross, and a layer of air provided between said hologram film surface relief pattern and said substrate surface, thereby to provide reflection of said image or other light pattern in visible light from the surface relief pattern at its interface with the air layer across said area, whereby the visual pattern of the substrate may also be viewed through the hologram film.

21. The combination of claim 20 wherein said article is a product package and said substrate is an advertising panel of said package.

22. The combination of claim 20 wherein the hologram film is held to said substrate by only an attraction caused by static electricity between them.

23. An article, comprising:
a piece of sheet material having an opening therein,
a substrate extending across said opening and characterized by being substantially transparent to light in a visible portion of the spectrum,
a thin flexible hologram film positioned across said substrate, said film including a surface relief pattern on a side facing said substrate surface from which an image or other light pattern may be reconstructed in light reflected from it but which is characterized by an absence of an opaque light reflecting layer over at least a substantial area thereacross, and
a layer of air provided between said hologram film surface relief pattern and said substrate surface across said substantial area, thereby to provide reflection of said image or other light pattern in visible light from the surface relief pattern at its interface with the air layer, whereby an object behind said window may also be viewed through the hologram film.

24. The combination of claim 23 wherein said article is a product package and said sheet material is a sidewall of said package, whereby said object includes the contents of said package which are viewable through said window.

25. A combination, comprising:
a thin flexible hologram film that is substantially optically transparent to light in a visible portion of the spectrum in at least a substantial continuous area thereacross, and including:
a surface relief pattern on one side thereof in said area that corresponds to a pattern of light interference fringes formed by an intersection of two coherent light beams, and
an absence of a light reflecting opaque layer over said surface relief pattern in said area, thereby providing a substantially transparent hologram in said area, and
a substrate sheet carrying said hologram film substantially adjacent thereto in a manner to maintain an air interface between them in a given region including said substantial hologram area, thereby to form an interface at the surface relief pattern of the hologram that reflects light in a visible portion of the spectrum directed through the hologram back away from said substrate.

26. The combination of claim 25 wherein the hologram film and substrate are characterized by being attracted to each other by static electricity, and wherein said substrate carries said hologram film only by such static electricity.

* * * * *

UNITED STATES PATENT AND TRADEMARK OFFICE
CERTIFICATE OF CORRECTION

PATENT NO.    : 4,921,319
DATED         : MAY 1, 1990
INVENTOR(S)   : DONALD W. MALLIK

It is certified that error appears in the above-identified patent and that said Letters Patent is hereby corrected as shown below:

Column 8, line 43 in Claim 15:   replace "12"
                                  with --11--

Column 8, line 44, in Claim 15:  replace "substrantially"
                                  with --substantially--

Signed and Sealed this

Twenty-eighth Day of May, 1991

Attest:

HARRY F. MANBECK, JR.

Attesting Officer

Commissioner of Patents and Trademarks